(12) United States Patent
Shah et al.

(10) Patent No.: US 12,122,243 B2
(45) Date of Patent: *Oct. 22, 2024

(54) METHOD AND SYSTEM TO ASCERTAIN LOCATION OF DRONE BOX FOR STABILIZED LANDING AND CHARGING OF DRONES

(71) Applicant: Sagar Defence Engineering Private Limited, Mumbai (IN)

(72) Inventors: Chirag Shah, Mumbai (IN); Saurabh Patil, Mumbai (IN); Mridul Babbar, Mumbai (IN); Lakshay Dang, Mumbai (IN); Vishal Veer Singh, Pune (IN)

(*) Notice: Subject to any disclaimer, the term of this patent is extended or adjusted under 35 U.S.C. 154(b) by 0 days.

This patent is subject to a terminal disclaimer.

(21) Appl. No.: 17/661,287

(22) PCT Filed: Aug. 7, 2021

(86) PCT No.: PCT/IN2021/050756
§ 371 (c)(1),
(2) Date: Jul. 5, 2022

(87) PCT Pub. No.: WO2022/162682
PCT Pub. Date: Aug. 4, 2022

(65) Prior Publication Data
US 2024/0190593 A1    Jun. 13, 2024

(30) Foreign Application Priority Data
Feb. 1, 2021   (IN) .............................. 202123004263

(51) Int. Cl.
*B64U 70/90* (2023.01)
*B60L 53/14* (2019.01)
(Continued)

(52) U.S. Cl.
CPC .............. *B60L 53/14* (2019.02); *B64U 70/90* (2023.01); *B64U 80/25* (2023.01);
(Continued)

(58) Field of Classification Search
CPC ...... B64U 80/25; B64U 70/90; B60L 2200/10
See application file for complete search history.

(56) References Cited

U.S. PATENT DOCUMENTS

| 10,479,528 | B1 | 11/2019 | Liang |
| 10,850,838 | B2 | 12/2020 | Castleman et al. |

(Continued)

FOREIGN PATENT DOCUMENTS

| KR | 101902875 B1 * | 10/2018 |
| WO | 2019125596 | 5/2019 |
| WO | 2021234722 | 11/2021 |

*Primary Examiner* — Christopher D Hutchens
(74) *Attorney, Agent, or Firm* — Ifica D. Mehra

(57) ABSTRACT

Method and system to ascertain location of drone box (100) for stabilized landing and charging of drones (10), comprising a plurality of drones (10) and at least a drone box (100) having a passive sensing circuit (149) detecting a touchdown signal of all the ground interface (11) of the drone (10, 10-1, 10-2) at a plurality of sensor zones (111) for a minimum prescribed time, a detection of any missing touch down signal for the minimum prescribed time due to an inappropriate landing preventing next take off of the drone (10, 10-1, 10-2), the passive sensing circuit (149) prevents activation of any sensor zone (111) till all the ground interfaces (11) are detected as touched down, the sensor zones (111) differentiates between presence of the ground interface (11) and any other presence including human touch, animal touch, foreign matter and or contamination and a combination thereof.

13 Claims, 15 Drawing Sheets

(51) Int. Cl.
*B64U 80/25* (2023.01)
*B64U 10/14* (2023.01)

(52) U.S. Cl.
CPC .......... *B60L 2200/10* (2013.01); *B64U 10/14* (2023.01); *B64U 2201/10* (2023.01)

(56) References Cited

U.S. PATENT DOCUMENTS

| | | | |
|---|---|---|---|
| 2016/0144734 A1* | 5/2016 | Wang | B60L 53/124 |
| | | | 701/17 |
| 2016/0336772 A1 | 11/2016 | Dallachiesa et al. | |
| 2019/0023133 A1* | 1/2019 | Renold | B64F 1/02 |
| 2019/0061885 A1* | 2/2019 | Baro | H02S 10/10 |
| 2019/0152326 A1* | 5/2019 | Nishikawa | B64F 1/362 |
| 2020/0001735 A1* | 1/2020 | Cheng | B64U 80/25 |
| 2020/0165007 A1* | 5/2020 | Augugliaro | B64U 30/20 |
| 2020/0301448 A1* | 9/2020 | Di Benedetto | G05D 1/227 |
| 2020/0354056 A1* | 11/2020 | Borras | G05D 1/102 |

* cited by examiner

Section A A

METHOD AND SYSTEM TO ASCERTAIN LOCATION OF DRONE BOX FOR STABILIZED LANDING AND CHARGING OF DRONES

The present invention comprises an improvement in, and a modification of, the invention claimed in the specification of the main patent application No. 202021020842.

FIELD OF THE INVENTION

The present invention relates to unmanned aerial vehicles which are commonly known as drones, particularly to autonomous aerial vehicles, and more particularly to landing and charging of autonomous aerial vehicles or drones on charging platforms or landing platforms.

BACKGROUND OF THE INVENTION

Drones, the unmanned aerial vehicles are increasingly getting involved in functions of modern life. Initial drones were assisted in take-off and landing however they are rapidly becoming technologically advanced in terms of managing newer functions of self-management. Unassisted landing of unmanned aerial vehicles now plays a vital role in autonomous as well as semi-autonomous devices. Such landing may be complex in environment with weak or no navigational signals. It is a further challenge to land on moving platforms. A precision landing paves way for further activities like charging batteries of drone, protected parking and safety of attachments from environment and attack.

There are numerous instances of drone landing or take-off operations leading to accidents and damage due to unstable operation. The landing and take-off processes are one of the most critical for the drone operations as it has to reduce or increase its thrust drastically and disarm or arm itself to detect landing or take-off. An inappropriate landing results into improper take-off.

Prior art discussed in the main application is not repeated here, and there are no significant further disclosures.

Innumerable possibilities of a UAV stabilized landing speed and orientation, situations including weather and other conditions create challenges, less understood, unattended and undisclosed so far. The present invention further bridges this big technological gap.

OBJECTIVE

An objective is to invent a landing station for an unmanned aerial vehicle.

Another objective is to charge batteries of landed drone(s).

Yet another objective is to invent a method of coordination between an unmanned aerial vehicle and a corresponding landing station.

Yet another objective is to invent a system of landing and un-assisted charging an unmanned aerial vehicle on a corresponding landing station.

Yet another objective is to ensure minimal human and animal hazard by the landing station.

Yet another objective is to prevent improper take-off from the landing station. Yet another objective is to manage contamination on landing station.

Yet another objective is to manage inappropriate landing and unstable landing.

SUMMARY OF INVENTION

The present invention is a system comprising one or more drone box and one or more drones. Each drone box has a drone platform. The drone platform has a plurality of limiting boundaries. The drone platform is divided into number of sensor zones. Each drone has a plurality of ground interfaces. The ground interfaces facilitate landing, parking and or charging corresponding drone. Each ground interface has a charging terminal at a far end. Each charging terminal has an interlocked switchable electricity polarity namely POSITIVE (+ve) or NEGATIVE (−ve) or NEUTRAL (N). The interlocked switchable polarity is switched by a Programmable Controller situated in the drone. Every landing drone has a default polarity of positive (+ve) and negative (−ve) on its two charging terminals.

As the drone (10-1) lands safely, the sensor zones (111) sense the default polarity of Positive(+ve) and Negative (−ve) of the ground interfaces of the first drone and corresponding sensor zones are activated with matching polarity to commence charging of batteries of the drone. More than one sensor zone detecting identical polarity are activated as a variation.

The identification coordinates of the activated sensor zones are communicable to a second drone so that the second drone knows where NOT to land on the drone box. Such communication enables a third and subsequent drone to ascertain whether the identified drone box is suitable and available for landing.

Only sensor zones occupied by a plurality of drones are activated so as to have highest safety and avoid loss of charge. In the event that may arise due to a defect or localized obstruction, if any and all the sensor zones fail to sense the default polarity of the Positive(+ve) and or the Negative (−ve) of the ground interfaces in a prescribed time, the drone switches the electrical polarity to another charging terminal.

As an improvement in the invention claimed in the specification of the main patent application No. 202021020842, it is to be understood that between a drone being airborne and safely landed, there exists a transient situation of an unstable landing to a stable and safe landing. Also, a stable and safe landing may be an appropriate landing, or an inappropriate landing.

The charging terminals of the plurality of ground interfaces of the drone do not generally touch down the drone platform at an identical instant. Further, ground interfaces bearing the charging terminals tend to bounce up few to several times after respective touch down. Wind and ground level may cause the ground interfaces to drag and skid on few to several sensor zones of the drone platform. Such a short time or transient situation is termed as the unstable situation resulting in the unstable landing.

As the first drone touches down, the sensor zones sense the default polarity of Positive (+ve) and Negative (−ve) of the corresponding ground interfaces of the first drone. Additionally, a passive sensing circuit looks for a touchdown signal of all the ground interface of the drone and prevents activation of any sensor zone till all the ground interfaces are detected as touched down and healthy and for a minimum prescribed time which may be several milliseconds to several seconds. Thereafter, the corresponding sensor zones are activated with matching polarity to commence charging of batteries of the drone.

In an event that the passive sensing circuit looking for a touchdown signal of all the ground interface of the drone does not detect all touch down signals for the minimum prescribed time, then it is likely that something is present between the corresponding ground interface and the sensor zone of the drone. This is diagnosed as an inappropriate landing and the drone is prevented from taking off, thereby avoiding a potential crash.

The sensor zones detect and differentiate between presence of the ground interface and any other presence including human touch, animal touch, foreign matter and or contamination and a combination thereof by a plurality of sensors and load cells. Any sensor zone detecting presence of nothing or anything other than a ground interface remains inactivated or potential free, thus safe.

The passive sensing circuit alternately and periodically develops a positive cycle loop when the sensor zones in contact with the ground interface of a positive terminal or dual polarity of the drone and the passive sensing circuit then develops a negative potential cycle loop when the sensor zones are in contact with the ground interface of negative terminal or dual polarity of the drone.

Thereafter, this negative and positive cycle loop is passed to a signal conditioning unit which informs the decision-making processor where the positive, negative or dual-polarity ground interfaces of the drone have landed. The decision-making processor selects and allocates the required sensor zones for position sensed charging.

The passive sensing circuit periodically runs the sensing cycle to continuously sense the state of the drone platform and determine presence of drone and or any object; and in a suspicious condition the drone platform remains in an inactive state, thus safe and free from hazards. Thus, if a foreign object lands on the charging pad, or if the drone moves its position due to external factors (wind, human moving the drone etc.), the charging stops immediately and restarts only when suspicious conditions are restored for the minimum prescribed time.

The detection of contamination by the passive sensing circuit on the drone platform is a significant safety aspect. The contamination may happen before/after and or during the charging. The passive sensing circuit is calibrated for a no-charging contamination as well as a while-charging contamination situation. The passive sensing circuit is also calibrated for contamination detection even when the drone is not present on the drone platform.

While charging is in process with single and/or multiple drones if water spillage or rainwater contamination is detected on one or more sensor zones then the passive sensing circuit re-runs the complete sensing positive cycle loops and the negative cycle loops, re-determines the safe landing position of the single and/or multiple drones and resumes the charging safely.

The drone as well as the drone box are individually an autonomous system with an overlapping emergency switching back up. The Drone Box provides the overlapping switching back up to turn on and off the drone. As a variation, the drone box first senses that the drone has landed safely, before sending a signal to turn off the drone. If the drone box gets a command from the user to turn off the drone which hasn't yet landed safely then such a command from the user shall not be executed.

BRIEF DESCRIPTION OF DRAWINGS

FIG. 5A is a partial top view of a drone platform, while

DETAILED DESCRIPTION OF INVENTION

The present invention shall now be described with the help of accompanying drawings. It is to be expressly understood that various terms and details are to explain the inventive concept and should not be construed to limit the invention in any way whatsoever.

Figure 1:
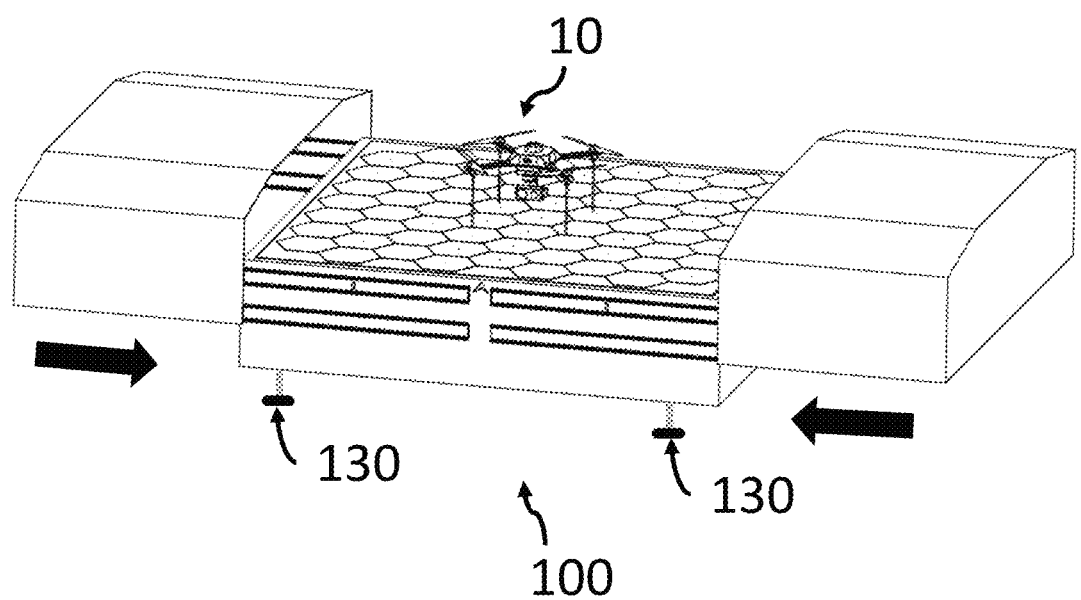
FIG. 1 is a perspective view of a drone box with a drone landed thereon.

The present invention is a system comprising one or more drone box (100) and one or more drones (10). The drone box (100) and the drone (10) mutually communicate through a proprietary network or through GPS, WIFI and or commercially available networks. FIG. 1.

Figure 2:
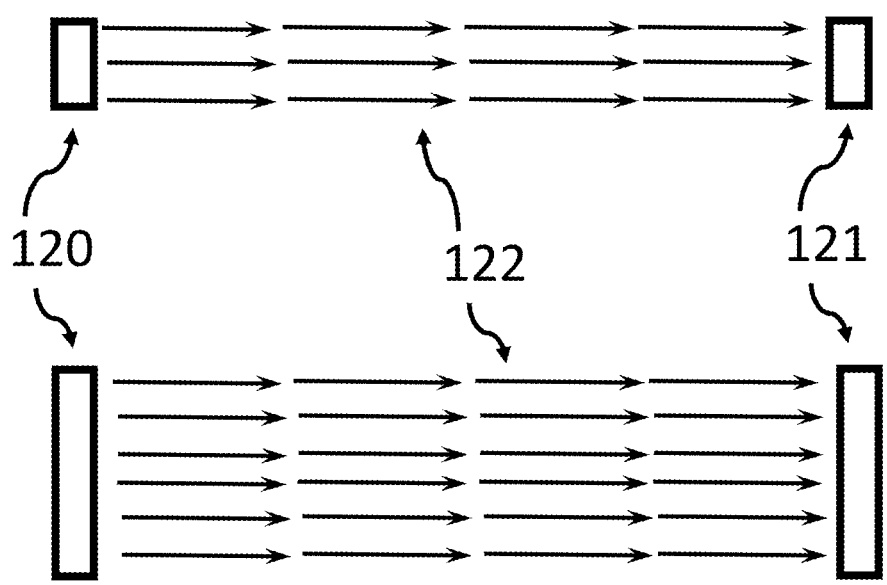
FIG. 2 is a top view and a front view of a line-of-sight radiation along with sources.

Each drone box (100) has a drone platform (110). The drone platform (110) has a plurality of limiting boundaries (113). FIG. 2, the limiting boundaries (113) are created optically, magnetically or such non-physical means that senses if any physical object is obstructing a line-of-sight radiation (122) of a source transmitter (120) and a source receiver (121). The source transmitter (121) and the source receiver (121) are disposed along the limiting boundaries (113). The drone platform (110) is divided into number of sensor zones (111). The sensor zones (111) are mechanically contiguous and electrically separated by an insulated separator (114) of insulation width (115). Each sensor zone (111) has an identification coordinate.

Figure 3:
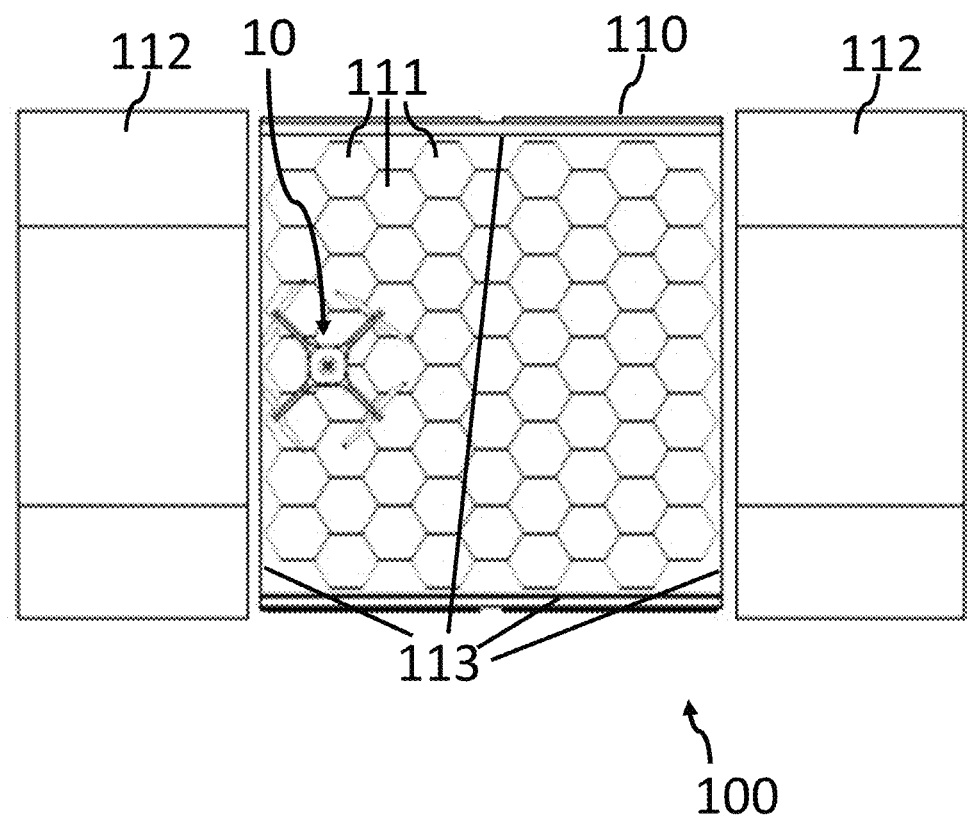
FIG. 3 is a top view of the drone box with the drone landed thereon in an unsafe location.

FIG. 3, the drone box (100) has a plurality of platform covers (112). The platform covers (112) are auto operable after meeting prescribed safety criterion for the plurality of drones (10).

Figure 4:
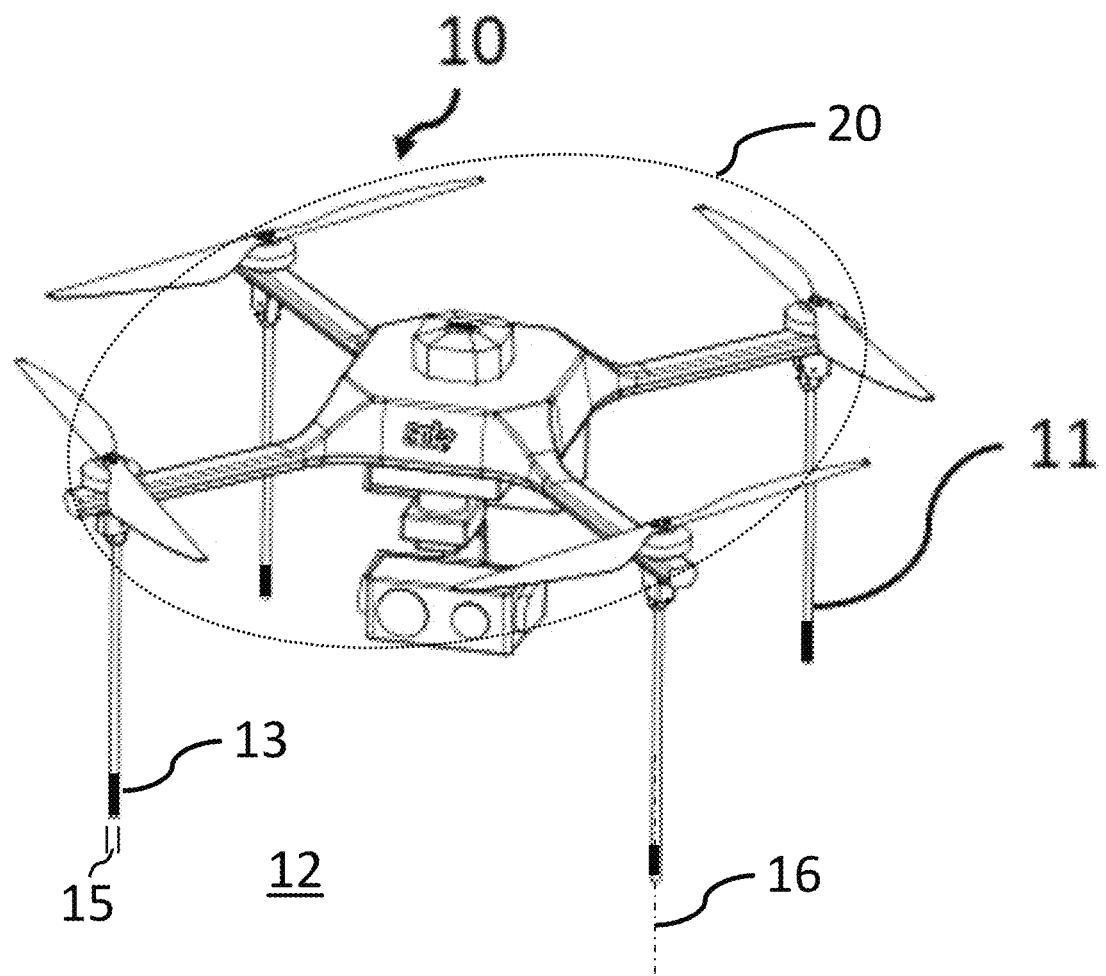
FIG. 4 is a perspective view of the drone.
Figure 5A:
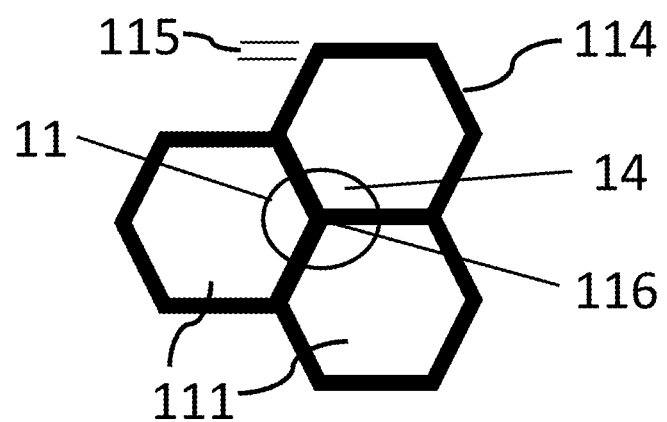
Figure 5B:
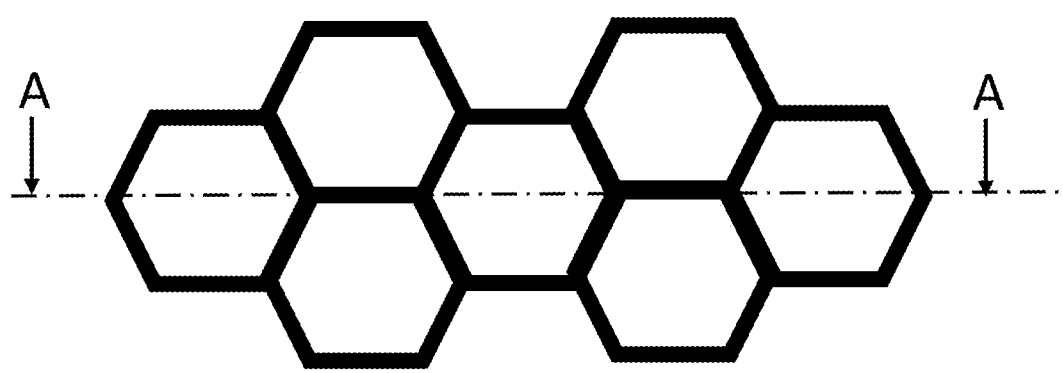
FIG. 5B is a partial top view and a sectional front view of the drone platform.
Figure 5B:
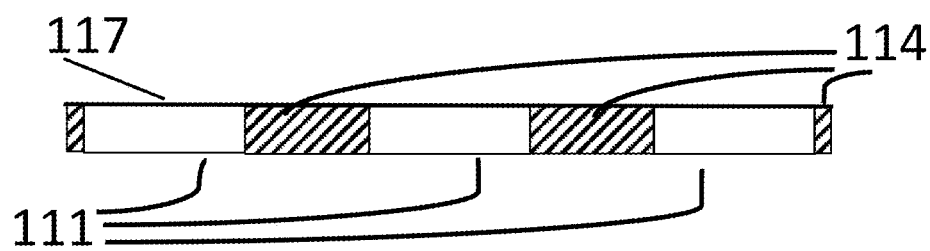

FIG. 4, each drone (10) has a plurality of ground interfaces (11). The ground interfaces (11) facilitate landing, parking and or charging corresponding drone (10). Each ground interface (11) of each drone (10) has a unique address code. Each ground interface (11) has a charging terminal (13) at a far end (12). Each charging terminal (13) has an interlocked switchable electricity polarity namely POSITIVE (+ve) or NEGATIVE (−ve) or NEUTRAL (N). The interlocked switchable polarity is switched by a Programmable Controller (15) situated in the drone (10). Every landing drone (10) has a default polarity of positive (+ve) and negative (−ve) on its two charging terminals (13). FIG. 5A, a minimum terminal dimension (15) of the charging terminal (13) is such that a minimum contact area (14) is ensured when an axis (16) of the ground interface (11) of the drone (10) exactly coincides with a center of intersection (116) of the adjacent sensor zones (111), since an upper surface (117) of the drone platform (110) is a level surface.

The drone (10), while air borne, ascertains and registers a precise position of the drone platform (110) of the drone box (100) in the vicinity by receiving its latitude and longitude from a global positioning system. While in a landing mode, the drone (10) auto pilots its trajectory from its own dynamic position to the latitude and longitude of the landing platform. The drone (10) vertically lands within a diameter less than twice its own envelope diameter (20).

Figure 6:
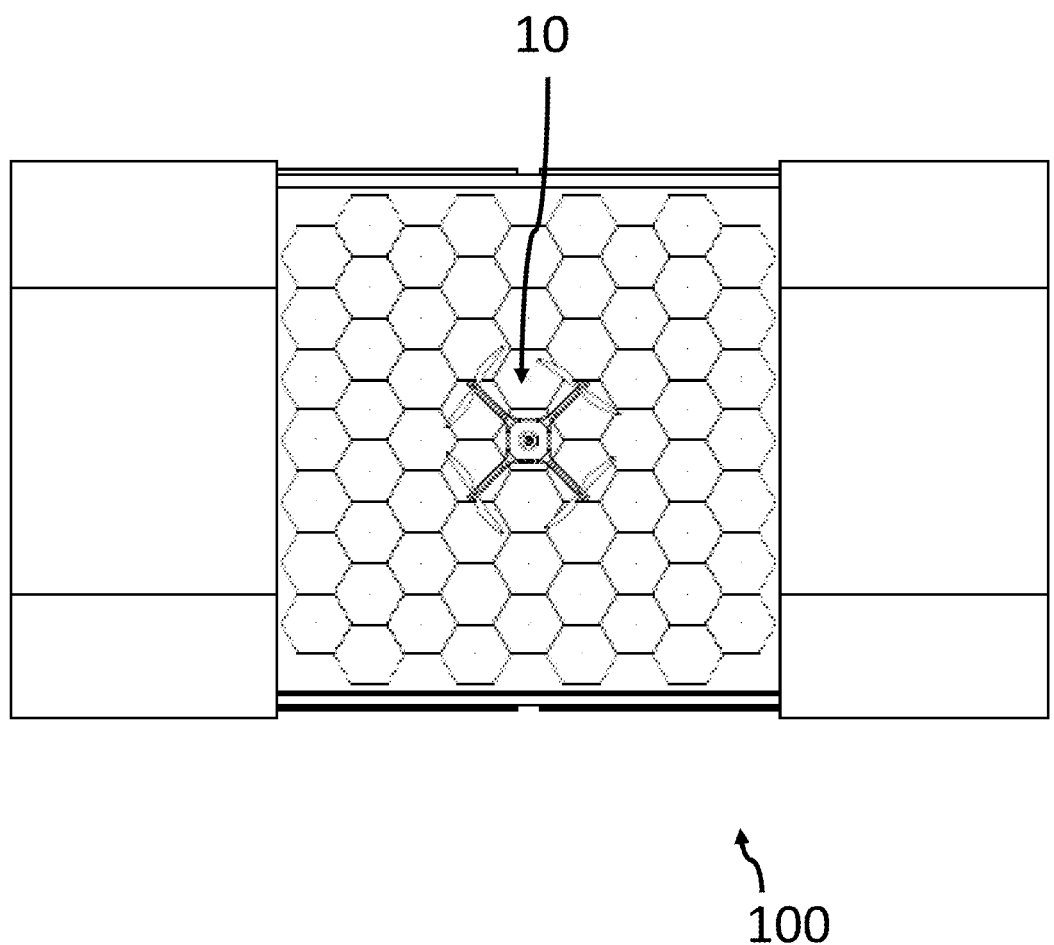
FIG. 6 is a top view of the drone box with the drone landed thereon on a safe location.
Figure 7:
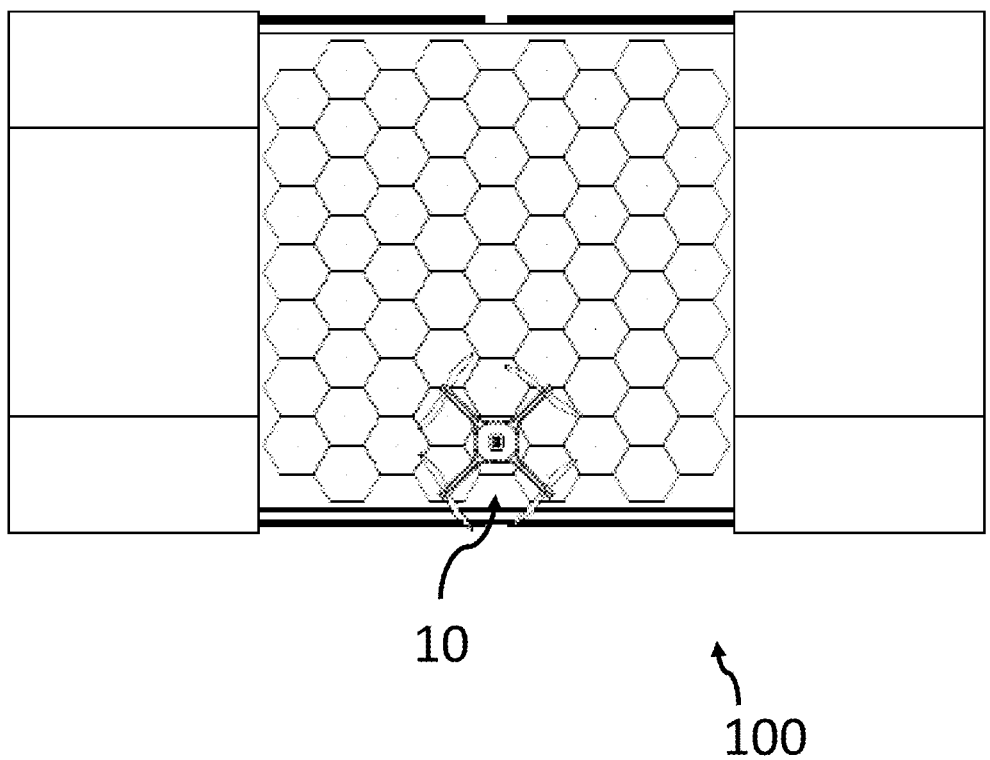
FIG. 7 is a top view of the drone box with the drone landed thereon on an unsafe location.

When any drone (10) lands on a drone box (100), an algorithm involving the unique address code of the ground interface (11) and the identification coordinates of the sensor zones (111) ascertains whether the drone has landed safely that is clear of all limiting boundaries (113) as shown in FIG. 6 or the drone (10) has landed unsafely as shown in FIG. 7. In the event the drone has landed unsafely, the drone (10) takes off and attempt another landing. In the event of a pre-decided numbers of unsuccessful attempts, a number of back up actions are initiated including prevention of movement of the platform covers (112), alarm/signal for manual intervention.

Once a drone has safely landed, the ground interface (11) facilitates charging of the batteries installed in the drone (10) via the sensor zones (111).

Figure 8:
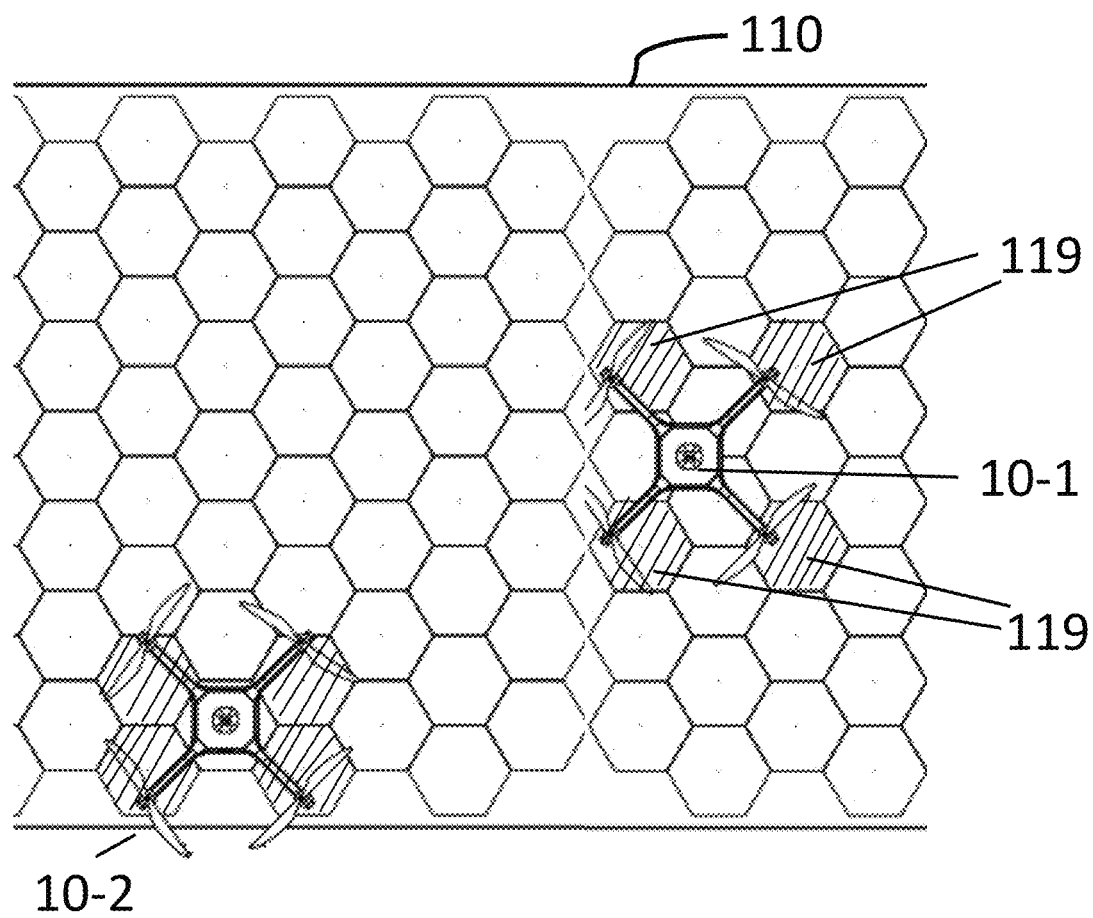
FIG. 8 is a top view of the drone platform with multiple drones landed and charging.

FIG. 8, charging of a first drone (10-1) and a second drone (10-2) having landed safely is described without limiting the invention to the description, as follows:

As the drone (10-1) lands safely, the sensor zones (111) sense the default polarity of Positive(+ve) and Negative (−ve) of the ground interfaces (11) of the first drone (10-1) and corresponding sensor zones (111) are activated with matching polarity so as to commence charging of batteries of the drone (10-1). More than one sensor zone (111) detecting identical polarity, as can be understood from FIG. 5A, are activated as a variation.

The identification coordinates of the activated sensor zones (119) are communicable to a second drone (10-2) so that the second drone (10-2) knows where NOT to land on the drone box. Such communication enables a third and subsequent drone (10-3, 10-4, . . . 10-n) to ascertain whether the identified drone box (100) is suitable and available for landing.

Only sensor zones (111) occupied by a plurality of drones (10-1, 10-2, . . . 10-n) are activated so as to have highest safety and avoid loss of charge.

In the event that may arise due to a defect or localized obstruction, if any and all the sensor zones (111) fail to sense the default polarity of the Positive(+ve) and or the Negative (−ve) of the ground interfaces (11) in a prescribed time, the drone (10) switches the electrical polarity to another charging terminal (13).

As an improvement in the invention claimed in the specification of the main patent application No. 202021020842, it is to be understood that between a drone (10) being airborne and safely landed, there exists a transient situation of an unstable landing to a stable and safe landing. Also, a stable and safe landing may be an appropriate landing, or an inappropriate landing (FIG. 12).

Figure 9:
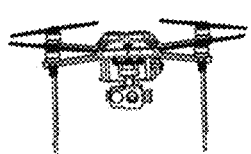
FIG. 9 is a perspective view of the drone about to touch down on a drone box.
Figure 9:
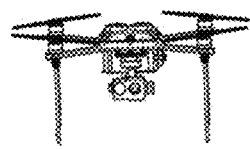
Figure 9:
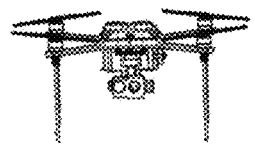
Figure 9:
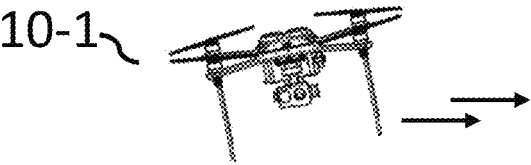
Figure 10:
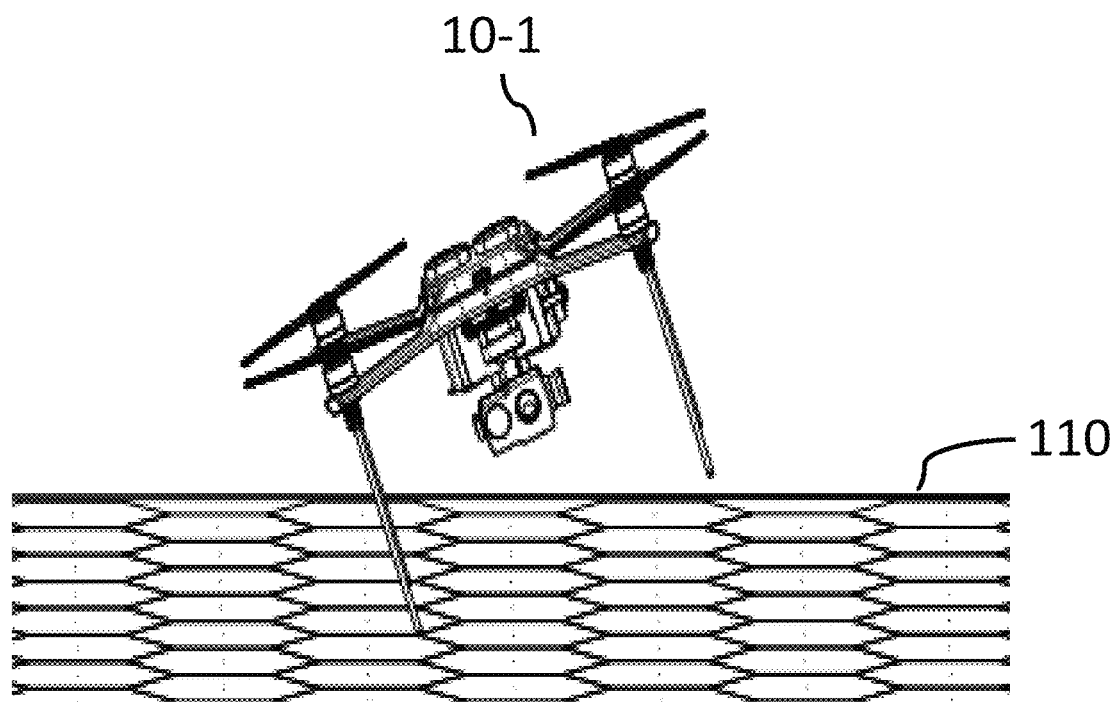
FIG. 10 is a perspective view of the drone in an unstable landing situation.

FIGS. 9 and 10, the charging terminals (13) of the plurality of ground interfaces (11) of the drone (10) do not generally touch down the drone platform (110) at an identical instant. Further, ground interfaces (11) bearing the charging terminals (13) have a tendency to bounce up few to several times after respective touch down. Wind and ground level may cause the ground interfaces (11) to drag and skid on few to several sensor zones (111) of the drone platform (110). Such a short time or transient situation is termed as the unstable situation resulting in the unstable landing.

As the first drone (10-1) touches down, the sensor zones (111) sense the default polarity of Positive(+ve) and Negative (−ve) of the corresponding ground interfaces (11) of the first drone (10-1). Additionally, a passive sensing circuit (149) looks for a touchdown signal of all the ground interface of the drone (10-1) and prevents activation of any sensor zone (111) till all the ground interfaces (11) are detected as touched down and healthy and for a minimum prescribed time which may be several milliseconds to several seconds. Thereafter, the corresponding sensor zones (111) are activated with matching polarity so as to commence charging of batteries of the drone (10-1). More than one sensor zone (111) detecting identical polarity, as can be understood from FIG. 5A, are activated as a variation.

Figure 12:
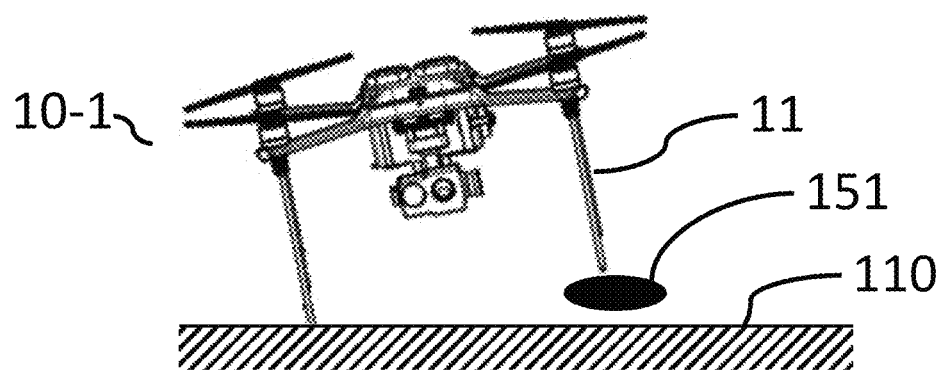
FIG. 12 is a perspective view of an inappropriate landing.
Figure 13A:
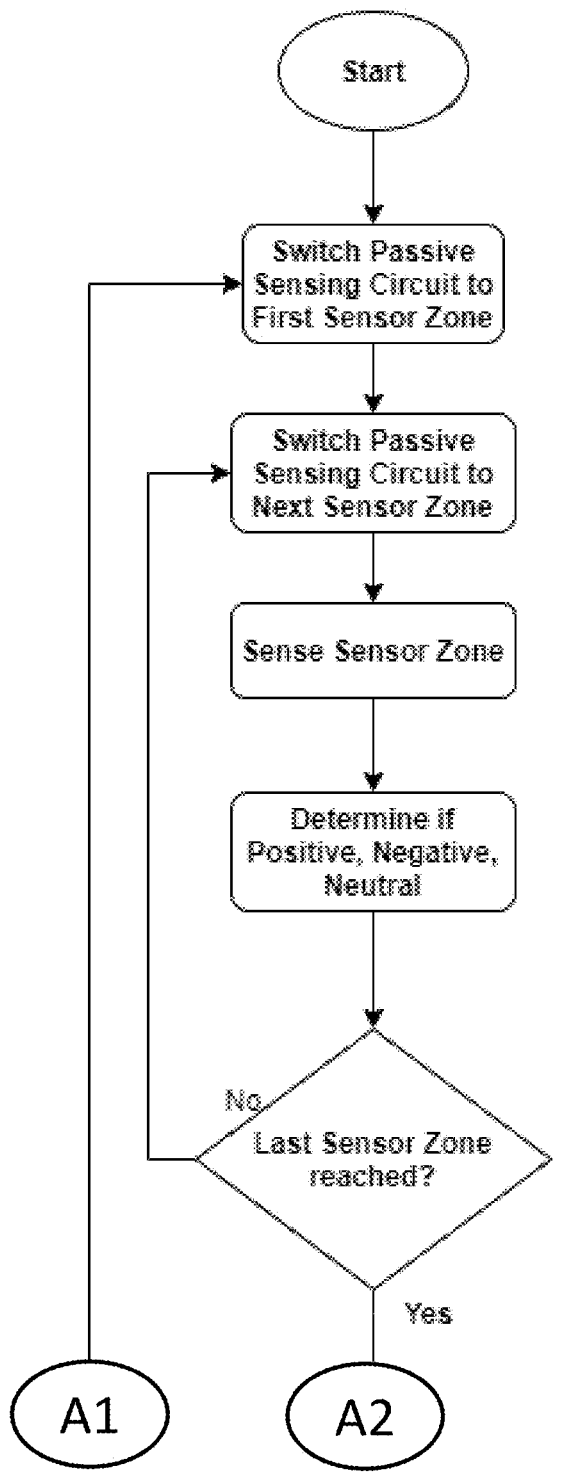
FIGS. 13A and 13B is a flow diagram of execution by the passive sensing circuit.
Figure 13B:
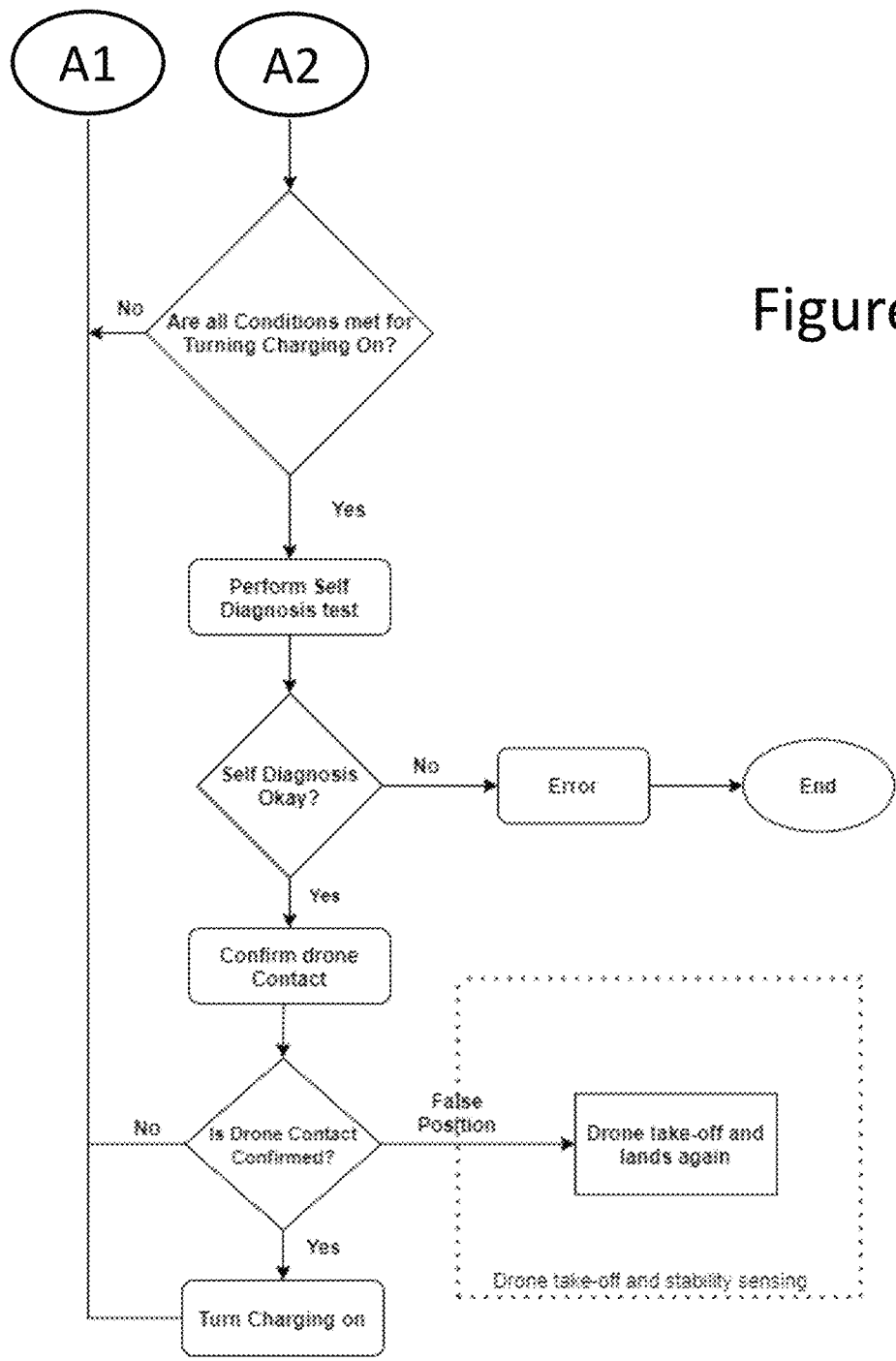

In an event that the passive sensing circuit (149) looking for a touchdown signal of all the ground interface (11) of the drone (10-1) does not detect all touch down signals for the minimum prescribed time, then it is likely that some obstruction (151), as shown in FIG. 12, is present between the corresponding ground interface (11) and the sensor zone (111) of the drone (10-1). This is diagnosed as an inappropriate landing and the drone (10-1) is prevented from taking off, thereby avoiding a potential crash.

The sensor zones (111) detect and differentiate between presence of the ground interface (11) and any other presence including human touch, animal touch, foreign matter and or contamination and a combination thereof by a plurality of sensors (141) and load cells (142). Any sensor zone (111) detecting presence of nothing or anything other than a ground interface (11) remains inactivated or potential free, thus safe.

Figure 11:
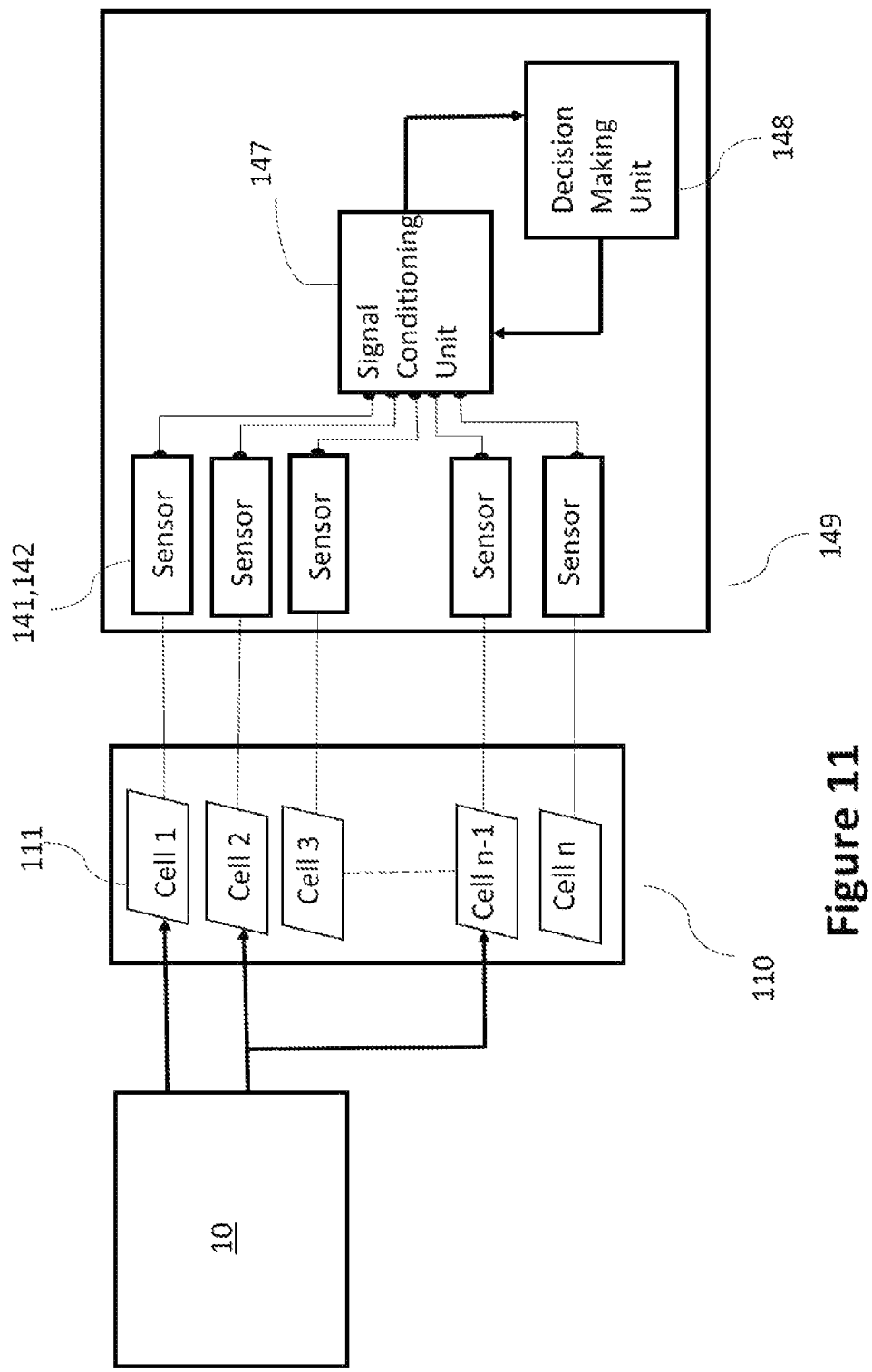
FIG. 11 is a flow diagram of a passive sensing circuit.

FIG. 11, 13A, 13B, the passive sensing circuit (149) alternately and periodically develops a positive cycle loop when the sensor zones (111) in contact with the ground interface (11) of a positive terminal or dual polarity of the drone (10) and the passive sensing circuit (149) then develops a negative potential cycle loop when the sensor zones (111) are in contact with the ground interface (11) of negative terminal or dual polarity of the drone (10).

Thereafter, this negative and positive cycle loop is passed to a signal conditioning unit (147) which informs the decision-making processor (148) where the positive, negative or dual-polarity ground interfaces (11) of the drone (10) have landed. The decision-making processor (148) selects and allocates the required sensor zones (111) for position sensed charging.

The same process is followed for the multiple drone (10-1, 10-2, . . . ) landing on the same drone platform (110) but at different sensor zones (111). A decision-making processor (148) selects and allocates only the required sensor zones (111) for position sensed charging. The other sensor zones (111) remain completely isolated and inactive and hence ready to detect detects where any positive, negative or dual-polarity ground interfaces (11) of the drone (10-2, 10-3, . . . ) are located. The decision-making processor (148) accordingly allocates the required sensor zones (111) for charging.

The passive sensing circuit (149) periodically runs the sensing cycle to continuously sense the state of the drone platform (110) and determine presence of drone (10) and or any object; and in a suspicious condition the drone platform (110) remains in inactive state, thus safe and free from hazards. Thus, if a foreign object lands on the charging pad, or if the drone (10) moves its position due to external factors (wind, human moving the drone etc.), the charging stops immediately and restarts only when suspicious conditions are restored for the minimum prescribed time.

The detection of contamination by the passive sensing circuit (149) on the drone platform (110) is a significant safety aspect. The contamination may happen before/after and or during the charging. The passive sensing circuit (149) is calibrated for no-charging contamination as well as while-charging contamination. The passive sensing circuit is also calibrated for contamination detection even when the drone is not present on the drone platform.

While charging is in process with single and/or multiple drones if water spillage or rainwater contamination is detected on one or more sensor zones (111) then the passive sensing circuit (149) re-runs the complete sensing positive cycle loops and the negative cycle loops, re-determines the safe landing position of the single and/or multiple drones and resumes the charging safely.

If excessive dust and or contamination takes place, the charging may not be possible, or the time required for charging may increase. The sensor zones (111) sense the level of dust contamination on the drone platform (110) by sensing a prescribed parameter between the sensor zones (111) and the corresponding ground interface (11) of the drone (10). The prescribed parameter is monitored during charging. The prescribed parameter is also monitored when the drone has landed but is not charging.

If water spillage or rainwater or dust or foreign object contamination takes place on the sensor zones (111), at that time the passive sensing circuit (149) detects a variation in the prescribed parameter between the sensor zones (111). The passive sensing circuit detects faults by sensing the variation in the prescribed parameter between the sensor zones in all condition if drone is present or not on sensor zone and if the drone is charging or not.

If water spillage or rainwater or dust or foreign object contamination takes place on the sensor zones (111) when drone (10) is present and charging, the passive sensing circuit (149) detects the variation in prescribed parameter between the sensor zones (111) and the ground interface (11), due to ingress of contamination there between.

The passive sensing circuit (149) stops the charging and resumes after re-running the complete sensing positive cycle loops and the negative cycle loops and re-determining the safe landing position of the single and/or multiple drones.

The drone (10) as well as the drone box (100) are individually an autonomous system with an overlapping emergency switching back up. The Drone Box (100) provides the overlapping switching back up to turn on and off the drone (10).

As a variation, the drone box (100) first senses that the drone (10) has landed safely, before sending a signal to turn off the drone (10). If the drone box (100) gets a command from the user to turn off the drone (10) which hasn't yet landed safely then such a command from the user shall not be executed.

The prescribed parameter is an electrical including a resistive, a capacitive and or an inductive parameter, an optical, a sonic, a chemical including a pH parameter and or a combination thereof. The prescribed parameter is selectable. The variation in the prescribed selected parameter is calibrated for detection. The prescribed parameter may reduce or increase. Illustratively, an electrical parameter may reduce while opacity may increase for an identical level of contamination.

We claim:

1. A system of unmanned aviation vehicles comprising the plurality of unmanned aviation vehicles capable of vertical landing and takeoff, the system communicating through a proprietary network or through GPS, WIFI and or commercially available networks, the system further comprising:

at least one drone box (100), each drone box (100) having:
a drone platform (110) with a plurality of limiting boundaries (113), made of a source transmitter (120) and a source receiver (121) with magnetic or optical line of sight radiation (122) therebetween, and disposed along the limiting boundaries (113), the drone platform (110) further divided into a number of sensor zones (111), that are mechanically contiguous and electrically separated by an insulated separator (114) of insulation width (115), each sensor zone (111) having identification coordinates;
a levelled upper surface (117) of the drone platform (110); and
a plurality of platform covers (112),
wherein each unmanned aerial vehicle being a drone (10, 10-1, 10-2) having a plurality of ground interfaces (11), each ground interface (11) of each drone (10) having a unique address code, each ground interface (11) has a charging terminal (13) at a far end (12), each charging terminal (13) having an interlocked switchable electricity polarity positive (+ve) or negative (−ve) or neutral (N),
a minimum terminal dimension (15) of the charging terminal (13) is such that a minimum contact area (14) is ensured when an axis (16) of the ground interface (11) of the drone (10) exactly coincides with a center of intersection (116) of the adjacent sensor zones (111), the ground interface (11) facilitates charging of batteries installed in the drone (10) via the sensor zones (111) after a safe landing of the drone (10); and
a passive sensing circuit (149) detecting a touchdown signal of all the ground interface of the drone (10, 10-1, 10-2) at a plurality of sensor zones (111) for a minimum prescribed time, a detection of any missing touch down signal for the minimum prescribed time due to an inappropriate landing preventing a next take off of the drone (10, 10-1, 10-2).

2. The system of unmanned aviation vehicles as claimed in claim 1, wherein the passive sensing circuit (149) prevents activation of any sensor zone (111) until all the ground interfaces (11) are detected as touched down.

3. The system of unmanned aviation vehicles as claimed in claim 1, wherein the sensor zones (111) differentiate between presence of the ground interface (11) and any other presence including human touch, animal touch, foreign matter and or contamination and a combination thereof by a plurality of sensors (141) and load cells (142).

4. The system of unmanned aviation vehicles as claimed in claim 1, wherein the passive sensing circuit (149) alternately and periodically develops a positive cycle loop when the sensor zones (111) in contact with the ground interface (11) of the positive terminal or dual polarity of the drone (10) and the passive sensing circuit (149) then develops a negative potential cycle loop when the sensor zones (111) are in contact with the ground interface (11) of the negative terminal or dual polarity of the drone (10).

5. The system of unmanned aviation vehicles as claimed in claim 1, wherein the passive sensing circuit (149) periodically runs a sensing cycle to continuously sense the state of the drone platform (110) and determine presence of drone (10) and or any object and in a suspicious condition the drone platform (110) remains in the inactive state.

6. The system of unmanned aviation vehicles as claimed in claim 1, wherein the circuit (149) stops the charging if the drone (10) moves its position due to an external factor or if a foreign object lands on the charging pad, then the charging restarts after a minimum prescribed period of resolution of a suspicious condition.

7. The system of unmanned aviation vehicles as claimed in claim 1, wherein the passive sensing circuit (149) is calibrated for a no-charging contamination situation as well as a while-charging contamination situation, and contamination detection when the drone (10) is not present on the drone platform (110).

8. The system of unmanned aviation vehicles as claimed in claim 1, wherein the passive sensing circuit (149) detects a variation in a prescribed parameter than a calibrated prescribed parameter between the sensor zones (111) in the situation of no-charging as well as a while-charging contamination.

9. The system of unmanned aviation vehicles as claimed in claim 1, wherein the passive sensing circuit (149) detects a variation in a prescribed parameter with respect to a calibrated prescribed parameter between the sensor zones (111) and the corresponding ground interface (11) of the drone in a situation of while-charging contamination or in a situation of no-charging contamination, wherein in a situation of while-charging contamination, the passive sensing circuit (149) stops the charging and resumes after re-running a complete sensing positive cycle loops and the negative cycle loops and re-determining a safe landing position of the single and/or multiple drones.

10. The system of unmanned aviation vehicles as claimed in claim 8 or 9, wherein the prescribed parameter is an electrical parameter including a resistive, a capacitive and or an inductive parameter, an optical, a sonic, a chemical including a pH parameter and or a combination thereof, wherein the prescribed parameter is selectable, and wherein the variation in a prescribed selected parameter is calibrated for detection.

11. The system of unmanned aviation vehicles as claimed in claim 1, wherein the drone (10) and the drone box (100) are individually an autonomous system with an overlapping emergency switching back up wherein the drone box (100) provides the overlapping switching back up to turn on and off the drone (10).

12. The system of unmanned aviation vehicles as claimed in claim 1, wherein the drone box (100) first senses that the drone (10) has landed safely, before sending a signal to turn off the drone (10), and if the drone box (100) gets a command from the user to turn off the drone (10) which hasn't yet landed safely then such a command from user is unexecuted.

13. The system of unmanned aviation vehicles as claimed in claim 10, wherein the prescribed parameter may reduce or increase for an identical level of contamination.

* * * * *